United States Patent [19]

East

[11] 4,285,852
[45] Aug. 25, 1981

[54] ANISOTROPIC WHOLLY AROMATIC POLYESTER DERIVED FROM 4-HYDROXY-4'-CARBOXY AZOBENZENE AND PROCESS FOR PREPARATION

[75] Inventor: Anthony J. East, Madison, N.J.

[73] Assignee: Celanese Corporation, New York, N.Y.

[21] Appl. No.: 109,575

[22] Filed: Jan. 4, 1980

[51] Int. Cl.$^3$ ............................................. C08G 63/02
[52] U.S. Cl. ................................ 260/37 R; 260/40 R; 260/40 P; 528/176; 528/190; 528/193; 528/194
[58] Field of Search ................ 260/37 R, 40 R, 40 P; 528/176, 190, 193, 194

[56] References Cited

U.S. PATENT DOCUMENTS

| | | | |
|---|---|---|---|
| 3,493,522 | 2/1970 | Webb | 528/176 |
| 3,639,340 | 2/1972 | Balme et al. | 528/179 |
| 3,966,678 | 6/1976 | Gruffaz et al. | 528/125 |
| 3,991,013 | 11/1976 | Pletcher | 528/190 |

OTHER PUBLICATIONS

Korshak et al. *Chem. Abstr.*, vol. 62, 1965, 13252e.
Korshak et al. *Chem. Abstr.*, vol. 63, 1965, 687b.

*Primary Examiner*—Maurice J. Welsh
*Attorney, Agent, or Firm*—Kenneth A. Genoni

[57] ABSTRACT

A wholly aromatic polyester capable of forming an anisotropic melt is prepared which is derived from 4-hydroxy-4'-carboxy azobenzene or its halogen, lower alkyl or lower alkoxy derivatives. Additional aryl moieties, such as those derived from aromatic hydroxy acids (e.g., p-hydroxybenzoic acid, 6-hydroxy-2-naphthoic acid), or an aromatic diol (e.g., hydroquinone) in combination with an aromatic diacid (e.g., terephthalic acid), may be included with the moiety derived from 4-hydroxy-4'-carboxy azobenzene. The polyester is preferably prepared by the melt polymerization of the esterified (e.g., acetylated) monomer or monomers (as described). The polyester may be melt processed into fibers, films or other shaped articles which may include conventional filler materials and/or reinforcing agents.

47 Claims, No Drawings

ANISOTROPIC WHOLLY AROMATIC POLYESTER DERIVED FROM 4-HYDROXY-4'-CARBOXY AZOBENZENE AND PROCESS FOR PREPARATION

BACKGROUND OF THE INVENTION

Aromatic polyester resins have long been known. For instance, p-hydroxy benzoic acid homopolymer and copolymers have been provided in the past and are commercially available. Those aromatic polyesters normally encountered in the prior art have tended to be somewhat intractable in nature and to present substantial difficulties if one attempts to melt process the same while employing conventional melt processing procedures. Such polymers commonly are crystalline in nature, relatively high melting or possess a decomposition temperature which is below the melting point, and when molten frequently exhibit an isotropic melt phase. Molding techniques such as compression molding or sintering may be utilized with such materials; however, injection molding, melt spinning, etc., commonly have not been viable alternatives or when attempted commonly have been accomplished with difficulty. Such polymers commonly cannot be melt extruded to form nondegraded fibers. Even those aromatic polymers which exhibit a melting point below their decomposition temperature commonly melt at such high temperatures that quality fibers may not be melt spun. For instance, fibers melt extruded at extremely high temperatures commonly possess a voidy internal structure and diminished tensile properties.

Representative publications which discuss aromatic polyesters include: (a) *Polyesters of Hydroxybenzoic Acids*, by Russell Gilkey and John R. Caldwell, J. of Applied Polymer Sci., Vol. II, Pages 198 to 202 (1959), (b) *Polyarylates* (*Polyesters from Aromatic Dicarboxylic Acids and Bisphenols*), by G. Bier, Polymer, Vol. 15, Pages 527 to 535 (August 1974), (c) *Aromatic Polyester Plastics*, by S. G. Cottis, Modern Plastics, Pages 62 to 63 (July 1975), and (d) *Poly (p-Oxybenzoyl Systems): Homopolymer for Coatings: Copolymers for Compression and Injection Molding*, by Roger S. Storm and Steve G. Cottis, Coatings Plast. Preprint, Vol. 34, No. 1, Pages 194 to 197 (April 1974). See also, U.S. Pat. Nos. 3,039,994; 3,169,121; 3,321,437; 3,553,167; 3,637,595; 3,651,014; 3,723,388; 3,759,870; 3,767,621; 3,778,410; 3,787,370; 3,790,528; 3,829,406; 3,890,256; and 3,975,487.

It more recently has been disclosed that certain polyesters may be formed which exhibit melt anisotropy. See for instance, (a) *Polyester X7G-A Self Reinforced Thermoplastic*, by W. J. Jackson, Jr., H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1 to 4, (b) Belgian Pat. Nos. 828,935 and 828,936, (c) Dutch Pat. No. 7505551, (d) West German Pat. Nos. 2520819, 2520820, 2834535, 2834536, and 2834537, (e) Japanese Pat. Nos. 43-233, 2132-116, 3017-692, and 3021-293, (f) U.K. Patent Application No. 2,002,404, and (g) U.S. Pat. Nos. 3,991,013; 3,991,014; 4,066,620; 4,067,852; 4,075,262; 4,083,829; 4,118,372; 4,130,545; 4,153,779; 4,156,070; 4,159,365; 4,161,470; and 4,169,933. See also commonly assigned U.S. Ser. Nos. 877,917, filed Feb. 15, 1978 and now U.S. Pat. No. 4,184,996, issued Jan. 22, 1980; 10,392, filed Feb. 8, 1979 and now U.S. Pat. No. 4,238,599 issued Dec. 9, 1980; 10,393, filed Feb. 8, 1979 and now U.S. Pat. No. 4,238,598, issued Dec. 9, 1980; 17,007, filed Mar. 2, 1979 and now U.S. Pat. No. 4,230,817, issued Oct. 28, 1980; 21,050, filed Mar. 16, 1979 and now U.S. Pat. No. 4,224,433, issued Sept. 23, 1980; 32,086, filed Apr. 23, 1979 and now U.S. Pat. No. 4,219,461, issued Aug. 26, 1980; and 54,049, filed July 2, 1979.

Additionally, it is known that a variety of polymers can be prepared which possess the recurring unit:

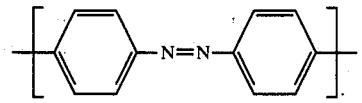

For example, U.S. Pat. Nos. 3,501,444 and 3,697,478 describe aromatic azopolymers containing amide linkages that are prepared by an oxidative coupling technique. The described azopolymers may be processed into fibers, films, and other shaped articles. U.S. Pat. No. 3,639,340 discloses thermostable polymers which are prepared by the polycondensation of a phenol or a polyphenol with a dianhydride having a generic formula which includes azophthalic and azoxyphthalic acids. The polymers may be used to form molded articles, laminates and varnishes. U.S. Pat. No. 3,966,678 relates to a multicellular synthetic polymer which is prepared by the reaction of maleic anhydride and a polyaldimine. The polyaldimine has an extensive generic formula which encompasses the product of such reactants as 4,4'-diamino-azobenzene and 4-formylazobenzene. The formed multicellular polymer is stated as being effective as an insulating material. Heterochain polyesters derived from 4,4'-azobenzenedicarboxylic acid are described in *Chemical Abstracts*, Vol. 62, 13252e (1965). Similar heterochain polyesters derived from 3,3'-azobenzene-dicarboxylic acid are described in *Chemical Abstracts*, Vol. 63, 687b (1975). In both abstracts, the formed polyesters are formulated into films. Although prior art of the type discussed in this paragraph discloses various polymers containing the azobenzene group, the search has continued for high strength, high modulus, low melting point polymers which may be processed into fibers, films and other types of shaped articles. This invention was developed as a result of that search.

It is an object of the present invention to provide a wholly aromatic polyester capable of forming an anisotropic melt which is derived from 4-hydroxy-4'-carboxy azobenzene.

It is an object of the present invention to provide an anisotropic wholly aromatic polyester derived from 4-hydroxy-4'-carboxy azobenzene which may be melt processed into fibers, films and other types of shaped articles.

It is an object of the present invention to provide a process for preparing a wholly aromatic polyester capable of forming an anisotropic melt which is derived from 4-hydroxy-4'-carboxy azobenzene by melt polymerizing the esterified monomers.

It is another object of the present invention to provide an anisotropic wholly aromatic polyester derived from 4-hydroxy-4'-carboxy azobenzene which may readily be melt processed into fibers, films, or three-dimensional shaped articles.

It is a further object of the present invention to provide an anisotropic wholly aromatic polyester derived from 4-hydroxy-4'-carboxy azobenzene which may be melt extruded to form fibers of a relatively high modulus of elasticity.

These and other objects, as well as the scope, nature and utilization of the invention will be apparent to those of ordinary skill in the art from the following detailed description and appended claims.

SUMMARY OF THE INVENTION

It has been found that a wholly aromatic polyester capable of forming an anisotropic melt comprises the recurring unit:

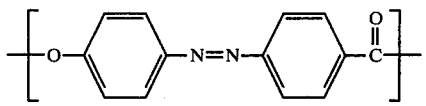

which may include substitution of at least one hydrogen atom present upon an aromatic ring with said optional substitution if present being selected from the group consisting of an alkyl radical of 1 to 4 carbon atoms, an alkoxy radical of 1 to 4 carbon atoms, halogen, and mixtures thereof.

It additionally has been found that a process for preparing a wholly aromatic polyester capable of forming an anisotropic melt comprises:

(a) esterifying the hydroxyl portion of a monomer having the formula

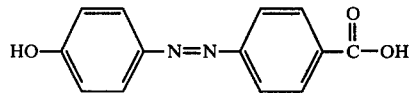

which may include substitution of at least one hydrogen atom present upon an aromatic ring with said optional substitution if present being selected from the group consisting of an alkyl radical of 1 to 4 carbon atoms, an alkoxy radical of 1 to 4 carbon atoms, halogen, and mixtures thereof;

(b) heating said esterified monomer to a temperature of from approximately 200° to 300° C. for from approximately 1 to 4 hours;

(c) reducing the reaction pressure to within the range from approximately 0.1 to about 5 mm. Hg and maintaining the temperature within the range of from about 275° to about 340° C. for from approximately 15 to 90 minutes while at said pressure; and (d) recovering the polyester.

DESCRIPTION OF PREFERRED EMBODIMENTS

The wholly aromatic polyesters of the present invention in preferred embodiments exhibit a highly desirable anisotropic melt phase at a temperature below approximately 350° C. (e.g., below approximately 320° C.). In a particularly preferred embodiment such anisotropic melt phase is exhibited at a temperature below approximately 300° C. (e.g., at a temperature in the range of approximately 260° to 295° C.). The polymer melting temperatures may be confirmed by the use of a differential scanning calorimeter (i.e., DSC) employing repeat scans at a 20° C. per minute heat-up rate and observing the peak of the DSC melt transition.

The aromatic polyester is considered to be "wholly" aromatic in the sense that each moiety present in the same contributes at least one aromatic ring to the polymer backbone.

The wholly aromatic polyester of the present invention is derived from 4-hydroxy-4'-carboxy azobenzene of the formula:

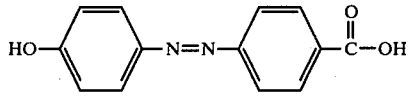

which may include substitution of at least one hydrogen atom present upon an aromatic ring. More specifically, the wholly aromatic polyester of the present invention comprises the recurring moiety

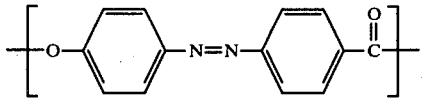

which may include substitution of at least one hydrogen atom present upon an aromatic ring, with the optional substitution if present being selected from the group consisting of an alkyl radical of 1 to 4 carbon atoms, an alkoxy radical of 1 to 4 carbon atoms, halogen, and mixtures thereof. Such moiety commonly is present in a concentration of at least 20 mole percent. The concentration of this moiety required to yield a polyester exhibiting an anisotropic melt phase may vary with the composition of the other moieties included in the polyester as will be apparent to those skilled in the art.

The 4-hydroxy-4'-carboxy azobenzene or its derivatives may be prepared from commercially available compounds using known techniques. For example, the 4-hydroxy-4'-carboxy azobenzene may be prepared by reacting para-aminobenzoic acid and phenol (or their appropriate derivatives) by diazotization and alkaline coupling. This technique generally involves the initial preparation of a mixture of para-aminobenzoic acid with water and concentrated hydrochloric acid. Enough acid must be present so that the pH at the conclusion of the diazotization is no more than 2.0. The mixture is chilled to a temperature within the range of from approximately 10° to 0° C., preferably at approximately 5° C., in the presence of approximately an equimolar amount (based on the amount of para-aminobenzoic acid) of sodium nitrite to yield a solution of the diazonium salt. However, a slight excess of sodium nitrite may advantageously be present.

A second mixture comprised of water, sodium hydroxide and about an equimolar amount (based on the amount of para-aminobenzoic acid) of phenol is prepared and similarly cooled to a temperature within the range of approximately 10° to −5° C., preferably at about 0° C. Enough sodium hydroxide is provided to neutralize any excess hydrochloric acid from the diazotization step.

The diazonium salt solution is then slowly added to the formed phenolate solution and the overall mixture is stirred for from approximately 0.5 to 2 hours. A deep red color commonly forms. If required sodium hydroxide is added to the mixture in order to keep the solution alkaline. The mixture is subjected to an extraction step using ether to remove any neutral materials that may be present. The alkaline mixture is acidified with concentrated hydrochloric acid and the resulting product is filtered, washed with distilled water and dried in a vacuum oven to obtain the 4-hydroxy-4'-carboxy azobenzene.

This compound may be recrystallized from ethanol/water to form red-brown needles which melt at approximately 264° to 270° C. See Cohen and McGilvery, *J. Biological Chem.*, pp. 266–267 (1946), and Feldman and Frankovskii, *Chem. Abs.*, Vol. 59, 9849g (1963). Alternatively, 4-hydroxy-4'-carboxy azobenzene may be prepared by the condensation of p-nitrosophenol with p-aminobenzoic acid or by other routes known to those skilled in the art. A specific example of a ring substituted compound from which this moiety may be derived is 4-hydroxy-3,5-dimethyl-4'-carboxy azobenzene.

The polyesters of the present invention are considered to be wholly aromatic in the sense that each moiety present therein contributes at least one aromatic ring. Accordingly, a wide variety of aromatic ester-forming compounds may be reacted with 4-hydroxy-4'-carboxy azobenzene or its derivatives to form polyesters capable of forming an anisotropic melt in accordance with the concept of the present invention.

In a preferred embodiment additional moieties derived from other hydroxy acids are included such as those derived from para-hydroxy benzoic acid and 6-hydroxy-2-naphthoic acid, or mixtures thereof. For instance, the additional recurring units may be

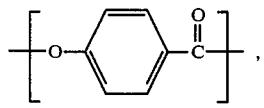

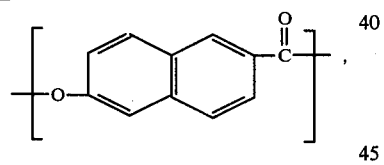

or mixtures thereof, and may include substitution of at least some hydrogen atoms present upon an aromatic ring with said optional substitution if present being selected from the group consisting of an alkyl radical of 1 to 4 carbon atoms, an alkoxy radical of 1 to 4 carbon atoms, halogen, and mixtures of the foregoing. In a particularly preferred embodiment the moiety derived from 4-hydroxy-4'-carboxy azobenzene is present in a concentration of approximately 20 to 80 mole percent (e.g., approximately 50 mole percent), and the moiety derived from one or more additional hydroxy acid is present in a concentration of approximately 20 to 80 mole percent (e.g., approximately 50 mole percent).

In a further preferred embodiment additional moieties derived from at least one aromatic diol in combination with moieties derived from at least one aromatic diacid are included in the wholly aromatic polyester. Such additional moieties may include ring substitution of at least one hydrogen atom present upon an aromatic ring. For instance the wholly aromatic polyester may include at least one symmetrical dioxy aryl moiety of the formula ─O─Ar─O─ wherein Ar is a divalent radical comprising at least one aromatic ring, and at least one symmetrical dicarboxy aryl moiety of the formula $$\left[ \begin{matrix} O & & O \\ \| & & \| \\ C - Ar - C \end{matrix} \right]$$

wherein Ar may be independently selected and is a divalent radical comprising at least one aromatic ring, with said optional substitution if present being selected from the group consisting of an alkyl radical of 1 to 4 carbon atoms, an alkoxy radical of 1 to 4 carbon atoms, halogen, and mixtures thereof. Such moieties are considered to be symmetrically disposed when the divalent bonds which join the moiety to other moieties in the main polymer chain are para to each other or are diagonally arranged when present on a naphthalene ring. In a particularly preferred embodiment the moiety derived from 4-hydroxy-4'-carboxy azobenzene is present in a concentration of approximately 30 to 70 mole percent (e.g., 60 mole percent), the symmetrical dioxy aryl moiety is present in a concentration of approximately 15 to 35 mole percent (e.g., 20 mole percent), and the symmetrical dicarboxy aryl moiety is present in a concentration of approximately 15 to 35 mole percent (e.g., 20 mole percent).

Representative symmetrical dioxy aryl moieties which may be present in the polymer clain include:

and mixtures of the foregoing.

Representative symmetrical dicarboxy aryl moieties which may be present in the polymer chain include:

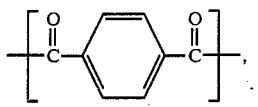

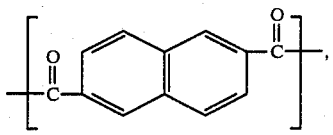

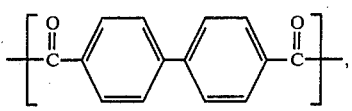

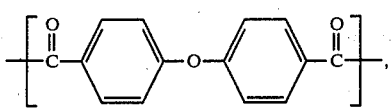

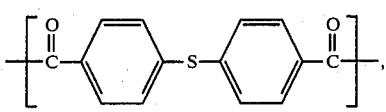

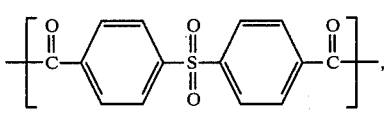

and mixtures of the foregoing.

The wholly aromatic polyester of the present invention may be formed by a variety of ester-forming techniques whereby organic monomer compounds possessing the requisite recurring moieties are reacted. For instance, the functional groups of the organic monomer compounds may be carboxylic acid groups, hydroxyl groups, ester groups, acyloxy groups, acid halides, etc.

In a preferred embodiment the hydroxyl portion of each monomer source is esterified prior to polymerization. The ester groups initially provided under such circumstances commonly possess 1 to 4 carbon atoms, and preferably are either acetate esters or propionate esters. The esterification of the monomer likewise may be performed in accordance with known techniques. Thus, for example, when the acetate ester is desired, the monomer may be heated at approximately 100° to 140° C. (e.g., under reflux conditions) for approximately 1 to 4 hours in the presence of a small quantity of concentrated sulfuric acid, anhydrous sodium acetate, potassium acetate, pyridine, or triethylamine, and a sufficient quantity of acetic anhydride to achieve complete acetylation. The mixture next is allowed to cool to room temperature during which time the acetylated monomer precipitates out in good yield. The mixture is then poured into a sufficient amount of distilled water to decompose any excess acetic anhydride. The precipitate is filtered, washed with water and vacuum dried to obtain the acetylated monomer. If desired, the acetylated monomer can be recrystallized in accordance with well known techniques such as by using glacial acetic acid, 2-ethoxy ethanol, 2-methoxy ethanol, 2-methoxy ethyl acetate, 2-ethoxy ethyl acetate, etc.

The desired polymerization readily may be accomplished by the melt polymerization of the esterified monomers on either a continuous, semi-continuous, or preferably on a batch basis. The melt polymerization may be achieved by first placing the required molar amounts of the esterified (e.g., acetylated) monomers in a reaction vessel equipped with a mechanical agitator, a gas inlet and a distillation head. Since the presence of oxygen tends to inhibit polymerization the reaction preferably is carried out in the substantial absence of oxygen. For instance, the reaction mixture is typically blanketed with an inert gas, such as nitrogen or argon, at substantially atmospheric pressure. The reaction vessel while at substantially atmospheric pressure is then heated for from approximately 1 to 4 hours at a temperature ranging from approximately 200° to 300° C., preferably from approximately 240° to 280° C. At the end of this time, the vessel may be gradually evacuated, e.g., over a period of from about 5 to about 15 minutes to a pressure of from about 0.1 to about 5 mm. Hg to remove acetic acid from the vessel. The temperature of the vessel during vacuum treatment is held in the range of from approximately 275° to 340° C., preferably from approximately 290° to 320° C., for from approximately 15 to 90 minutes.

To inhibit sublimation of the reactants, it is preferable to gradually raise the temperature of the reaction mixture, either incrementally or continuously, throughout the polymerization reaction. The reaction may be further improved by incorporating known amounts of conventional polyester catalysts, such as sodium acetate or antimony trioxide, to increase the rate of polymerization and the molecular weight of the polymer. Recovery of the formed polyester may be accomplished by simply admitting inert gas, cooling the reaction vessel to room temperature and removing the polyester from the vessel.

The wholly aromatic polyester of the present invention commonly exhibits

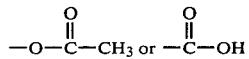

end groups depending upon the synthesis route selected. As will be apparent to those skilled in the art, the end groups optionally may be capped, e.g., acidic end groups may be capped with a variety of alcohols, and hydroxyl end groups may be capped with a variety of organic acids. For instance, end capping units such as phenylester

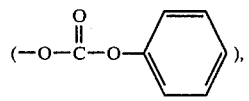

and methylester

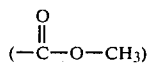

optionally may be included at the end of the polymer chains. The polymer also may be oxidatively cross-linked to at least some degree, if desired, by heating in a oxygen-containing atmosphere (e.g., in air) while in bulk form or as a previously shaped article at a temperature below its melting point for a limited period of time (e.g., for a few minutes).

The wholly aromatic polyesters of the present invention tend to be substantially insoluble in all common polyester solvents, such as hexafluoroisopropanol and ochlorophenol, and accordingly are not susceptible to solution processing. They can surprisingly be readily processed by common melt processing techniques as discussed hereafter. Most compositions are soluble to some degree in pentafluorophenol.

The polyester of the present invention is capable of forming an anisotropic melt (i.e., it forms liquid crystals). Anisotropy can be confirmed by standard polarized light techniques whereby crossed-polarizers are employed. Although the amount of light transmitted generally increases when a sample is sheared (e.g., by laterally moving the cover slide of a hot stage microscope), the melt is optically anisotropic even in the static state.

The wholly aromatic polyester additionally commonly exhibits an inherent viscosity (i.e., I.V.) of at least approximately 0.5 dl./g. and preferably at least approximately 1.0 dl./g. when dissolved in a concentration of 0.1 percent by weight in pentafluorophenol at 60° C.

The wholly aromatic polyester of the present invention readily can be melt processed to form a variety of shaped articles, e.g., molded three-dimensional articles, fibers, films, tapes, etc. The polyester of the present invention is suited for molding applications and may be molded via standard injection molding techniques commonly utilized when forming molded articles. Unlike the wholly aromatic polyesters commonly encountered in the prior art it is not essential that more severe injection molding conditions (e.g., higher temperatures), compression molding, impact molding, or plasma spraying techniques be utilized. Fibers or films may be melt extruded.

A molding compound may be formed from the wholly aromatic polyester of the present invention which incorporates approximately 1 to 60 percent by weight (e.g., 1 to 10 percent by weight) of a solid filler (e.g., talc) and/or reinforcing agent (e.g., glass fibers).

The wholly aromatic polyester also may be employed as a coating material which is applied as a powder or from a liquid dispersion.

When forming fibers and films the extrusion orifice may be selected from among those commonly utilized during the melt extrusion of such shaped articles. For instance, the shaped extrusion orifice may be in the form of a rectangular slit (i.e., a slit die) when forming a polymeric film. When forming a filamentary material the spinneret selected may contain one and preferably a plurality of extrusion orifices. For instance, a standard conical spinneret containing 1 to 2000 holes (e.g., 6 to 1500 holes) such as commonly used in the melt spinning of polyethylene terephthalate, having a diameter of about 1 to 60 mils (e.g., 5 to 40 mils) may be utilized. Yarns of about 20 to 200 continuous filaments are commonly formed. The melt-spinnable wholly aromatic polyester is supplied to the extrusion orifice at a temperature above its melting point, e.g., a temperature of about 300° to 320° C. in preferred embodiments.

Subsequent to extrusion through the shaped orifice the resulting filamentary material or film is passed in the direction of its length through a solidification or quench zone wherein the molten filamentary material or film is transformed to a solid filamentary material or film. The resulting fibers commonly have a denier per filament of about 1 to 50, and preferably a denier per filament of about 1 to 20.

The resulting filamentary material or film optionally may be subjected to a thermal treatment whereby its physical properties are further enhanced. The tenacity of the fiber or film generally is increased by such thermal treatment. More specifically, the fibers or films preferably may be thermally treated in an inert atmosphere (e.g., nitrogen, argon, helium) or alternatively in a flowing oxygen-containing atmosphere (e.g., air) with or without stress at a temperature below the polymer melting point until the desired property enhancement is achieved. Thermal treatment times commonly range from a few minutes to several days. As the fiber is thermally treated, its melting temperature progressively is raised. The temperature of the atmosphere may be staged or continuously increased during the thermal treatment or held at a constant level. For instance, the fiber may be heated at 250° C. for one hour, at 260° C. for one hour, and at 270° C. for one hour. Alternatively, the fiber may be heated at about 10° to 20° C. below the temperature at which it melts for about 45 hours. Optimum heat treatment conditions will vary with the specific composition of the wholly aromatic polyester and with the fiber's process history.

The following examples are given as specific illustrations of the claimed invention. It should be understood however, that the invention is not limited to the specific details set forth in the examples.

EXAMPLE I 15 grams (0.11 mole) of para-aminobenzoic acid are mixed with 70 ml. of water and 40 ml. of concentrated hydrochloric acid, and are cooled to 0° C. Next 8.3 grams of solid sodium nitrite gradually are added with stirring, while keeping the temperature below 5° C. and preventing the evolution of oxides of nitrogen. The solid dissolves yielding a clear solution of the diazonium salt.

Concurrently with the preparation of the diazonium salt solution, 10 grams (0.105 mole) of phenol are dissolved in 200 ml. of water and 10 grams of sodium hydroxide are added thereto. This solution is also chilled to 0° C.

The diazonium salt solution is slowly poured into the phenolate solution with stirring. An orange color develops and a precipitate forms. While undergoing agitation, the temperature of the mixture is slowly raised to 25° C. Sodium hydroxide is then added to the mixture in an amount sufficient to dissolve all of the precipitate. The resulting dark red alkaline solution is extracted with ether to remove any remaining neutral materials.

The alkaline solution is acidified with concentrated hydrochloric acid and the solid product is filtered, washed with warm water and is dried at 120° C. under a vacuum of 25 inches Hg for 8 hours.

This procedure yields 20.5 grams of a crude product having an orangish-brown color and a melting temperature of 247° to 250° C. (as determined by a Fisher-Johns apparatus). Infrared spectrum analysis reveals a chemical structure consistent with 4-hydroxy-4'-carboxy azobenzene.

13.4 grams of recrystallized 4-hydroxy-4'-carboxy azobenzene are refluxed for 1.5 hours with 50 ml. of acetic anhydride and one drop of concentrated sulfuric acid. The reaction mixture forms a deep red solution.

Upon cooling, orange crystals of product separate out, are filtered on a glass fritted funnel, are thoroughly washed with cold glacial acetic acid, and are dried in a vacuum oven at 120° C. for several hours. The crude product weighs 13.7 grams, i.e., 85 percent of the theoretical recovery, and is recrystallized.

14.2 grams (0.05 mole) of 4-acetoxy-4'-carboxy azobenzene prepared in accordance with the procedure previously described are charged to the polymerization apparatus together with 9 grams (0.05 moles) of para-acetoxybenzoic acid.

Upon heating with stirring while under a nitrogen atmosphere the mass begins to melt at about 220° C. and remains in a semi-solid state until a viscous, dark maroon melt occurs at 270° C. At this temperature, bubbles begin to form, but the liquid does not begin to distill until 290° C.

After 15 minutes at 290° C., the temperature is raised to 300° C. and a water pump vacuum (30 mm. Hg) is applied to remove any volatile material. At the end of one hour of these conditions, the dark red melt becomes pasty and very viscous. An oil pump vacuum (1.5 mm. Hg) is then applied for 30 minutes while the temperature is maintained at 300° to 310° C.

The vacuum is released with nitrogen and, after cooling to room temperature, the maroon copolyester is recovered from the flask. To further purify the product, it is extracted in a Soxhlet apparatus with acetone for two hours. The final dry weight of the product is 12 grams.

The thusly prepared copolyester exhibits an initial melting point of 263° C. using a differential scanning calorimeter (i.e., DSC) employing repeat scans at a 20° C. per minute heat-up rate and observing the peak of the DSC melt transition, and an inherent viscosity of 0.61 dl./g. when measured as a 0.1 percent solution in pentafluorophenol at 60° C.

When placed on a Köfler hot stage microscope, the copolyester forms an opaque melt which shows signs of softening at 300° to 320° C. At 340° C. the melt can be spread by pressing the cover slide. Between crossed polarizers, the melt is orange and birefringent i.e., it is anisotropic. Upon cooling, the melt solidifies at 250° C.

If desired, the polymer optionally is solid-state polymerized while present in powder form by heating in a stream of nitrogen gas at 250° C. for 12 hours. After such solid-state polymerization the polymer is substantially insoluble in pentafluorophenol even at 90° C., and its differential scanning calorimeter melting point increases to 278° C. A sharper and better defined endotherm peak is observed.

The molten polymer before or after solid-state polymerization may be melt extruded into stiff dark red fibers.

EXAMPLE II

Example I is repeated with the exceptions indicated.

14.1 grams (0.05 mole) 4-acetoxy-4'-carboxy azobenzene and 11.5 grams (0.05 mole) 6-acetoxy-2-naphthoic acid are heated in a polymerization apparatus fitted with a paddle stirrer and nitrogen inlet as in the preceding example. A trace (i.e., approximately 0.01 gram) of an antioxidant (i.e., Inganox 1010 antioxidant available from the Ciba-Geigy Corp.) is added and the mixture is heated in an oil-bath to 215° C. where it melts. At 240° C. acetic acid begins to distill and the temperature is slowly raised to 280° over 1 hour by which time all the acetic acid has evolved. After a further 30 minutes of heating at 280° C. a vacuum (0.3 mm. Hg) is gradually applied and stirring and heating are continued under vacuum for 30 minutes at 280° C., 15 minutes at 290° C., and 30 minutes at 295° C. The resulting viscous dark-red polymer has a pearly orange luster where it contacts the walls of the flask during stirring. The vacuum next is released with nitrogen and the stirrer removed. When cold, the polymer is removed from the polymerization apparatus, and is ground to 1/16 inch particles. Its inherent viscosity as measured from a 0.1 percent solution in pentafluorophenol at 60° C. is 0.80 dl./g. Differential scanning calorimetry shows a broad melting endotherm peaking at 290° C.

The resulting polymer melt is found to be anisotropic and is capable of melt extrusion to form fibers of a relatively high initial modulus.

EXAMPLE III

Example I is repeated wherein 0.06 mole 4-acetoxy-4'-carboxy azobenzene is polymerized with 0.02 mole hydroquinone diacetate, and 0.02 mole terephthalic acid. Substantially similar results are achieved.

Although the invention has been described with preferred embodiments, it is to be understood that variations and modifications may be resorted to as will be apparent to those skilled in this art. Such variations and modifications are to be considered within the scope of the following claims.

I claim:

1. A wholly aromatic polyester capable of forming an anisotropic melt comprising the recurring unit:

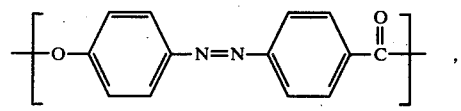

which may include substitution of at least one hydrogen atom present upon an aromatic ring with said optional substitution if present being selected from the group consisting of an alkyl radical of 1 to 4 carbon atoms, an alkoxy radical of 1 to 4 carbon atoms, halogen, and mixtures thereof.

2. A wholly aromatic polyester capable of forming an anisotropic melt in accordance with claim 1 which includes a recurring unit selected from the group consisting of:

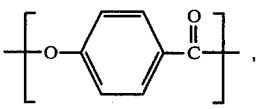

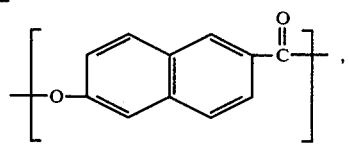

and mixtures thereof, which may include substitution of at least one hydrogen atom present upon an aromatic ring with said optional substitution if present being selected from the group consisting of an alkyl radical of 1 to 4 carbon atoms, an alkoxy radical of 1 to 4 carbon atoms, halogen, and mixtures of the foregoing.

3. A wholly aromatic polyester capable of forming an anisotropic melt in accordance with claim 1 which includes at least one symmetrical dioxy aryl moiety of the formula ─O─Ar─O─ and at least one symmetrical dicarboxy aryl moiety of the formula

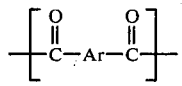

wherein Ar in each instance can be independently selected and is a divalent radical comprising at least one aromatic ring which may include substitution of at least one hydrogen atom present upon an aromatic ring with said optional substitution if present being selected from the group consisting of an alkyl radical of 1 to 4 carbon atoms, an alkoxy radical of 1 to 4 carbon atoms, halogen, and mixtures of the foregoing.

4. A wholly aromatic polyester in accordance with claim 1 which is capable of forming an anisotropic melt at a temperature below approximately 350° C.

5. A wholly aromatic polyester in accordance with claim 1 which is capable of forming an anisotropic melt at a temperature below approximately 320° C.

6. A wholly aromatic polyester in accordance with claim 1 which is capable of forming an anisotropic melt at a temperature below approximately 300° C.

7. A wholly aromatic polyester in accordance with claim 1 which exhibits an inherent viscosity of at least 0.5 dl./g. when dissolved in a concentration of 0.1 percent by weight in pentafluorophenol at 60° C.

8. A wholly aromatic polyester in accordance with claim 1 which exhibits an inherent viscosity of at least 1.0 dl./g. when dissolved in a concentration of 0.1 percent by weight in pentafluorophenol at 60° C.

9. The wholly aromatic polyester capable of forming an anisotropic melt in accordance with claim 1 which includes from approximately 1 to 60 percent by weight of a solid filler and/or reinforcing agent based on the total weight of the polyester.

10. A fiber which has been melt spun from the wholly aromatic polyester of claim 1.

11. A film which has been melt extruded from the wholly aromatic polyester of claim 1.

12. A molded article comprising the wholly aromatic polyester of claim 1.

13. A wholly aromatic polyester capable of forming an anisotropic melt at a temperature below approximately 350° C. consisting essentially of the recurring moieties I and II, which may include substitution of at least one hydrogen atom present upon an aromatic ring wherein:

I is

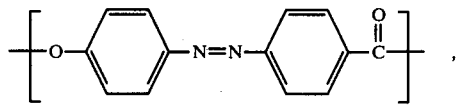

and

II is selected from the group consisting of

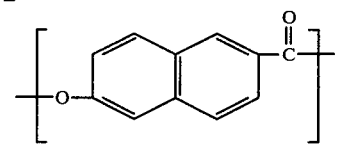

and mixtures thereof,
with said optional substitution if present being selected from the group consisting of an alkyl radical of 1 to 4 carbon atoms, an alkoxy radical of 1 to 4 carbon atoms, halogen, and mixtures thereof, and wherein said polyester comprises approximately 20 to 80 mole percent of moiety I and approximately 20 to 80 mole percent of moiety II.

14. A wholly aromatic polyester in accordance with claim 13 which is capable of forming an anisotropic melt at a temperature below approximately 320° C.

15. A wholly aromatic polyester in accordance with claim 13 which is capable of forming an anisotropic melt at a temperature below approximately 300° C.

16. A wholly aromatic polyester in accordance with claim 13 wherein moiety II is:

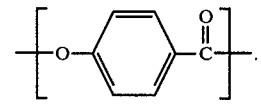

17. A wholly aromatic polyester in accordance with claim 13 wherein moiety II is:

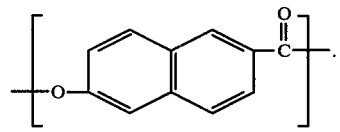

18. A wholly aromatic polyester in accordance with claim 13 which consist essentially of approximately 50 mole percent of moiety I and approximately 50 mole percent of moiety II.

19. A wholly aromatic polyester in accordance with claim 13 which exhibits an inherent viscosity of at least 0.5 dl./g. when dissolved in a concentration of 0.1 percent by weight in pentafluorophenol at 60° C.

20. A wholly aromatic polyester in accordance with claim 13 which exhibits an inherent viscosity of at least 1.0 dl./g. when dissolved in a concentration of 0.1 percent by weight in pentafluorophenol at 60° C.

21. The wholly aromatic polyester capable of forming an anisotropic melt in accordance with claim 13 which includes from approximately 1 to 60 percent by weight of a solid filler and/or reinforcing agent based on the total weight of the polyester.

22. A fiber which has been melt spun from the wholly aromatic polyester of claim 13.

23. A film which has been melt extruded from the wholly aromatic polyester of claim 13.

24. A molded article comprising the wholly aromatic polyester of claim 13.

25. A wholly aromatic polyester capable of forming an anisotropic melt at a temperature below approximately 350° C. consisting essentially of the recurring moieties I, II, and III, which may include substitution of at least one hydrogen atom present upon an aromatic ring wherein:

I is

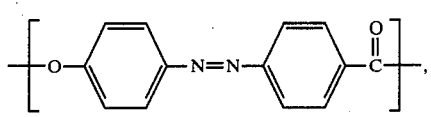

II is at least one symmetrical dioxy aryl moiety of the formula ─(O-Ar-O)─ wherein Ar is a divalent radical comprising at least one aromatic ring, and III is at least one symmetrical dicarboxy aryl moiety of the formula

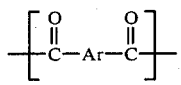

wherein Ar is a divalent radical comprising at least one aromatic ring, with said optional substitution if present being selected from the group consisting of an alkyl radical of 1 to 4 carbon atoms, an alkoxy radical of 1 to 4 carbon atoms, halogen, and mixtures thereof, and wherein said polyester comprises approximately 30 to 70 mole percent of moiety I, approximately 15 to 35 mole percent of moiety II, and approximately 15 to 35 mole percent of moiety III.

26. A wholly aromatic polyester in accordance with claim 25 which is capable of forming an anisotropic melt at a temperature below approximately 320° C.

27. A wholly aromatic polyester in accordance with claim 25 which is capable of forming an anisotropic melt at a temperature below approximately 300° C.

28. A wholly aromatic polyester in accordance with claim 25 wherein said symmetrical dioxy aryl moiety II is selected from the group consisting of:

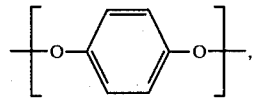

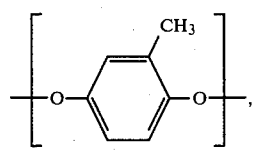

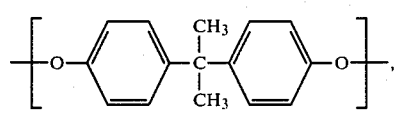

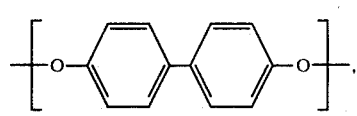

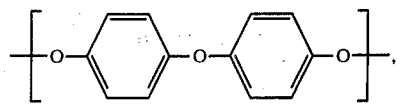

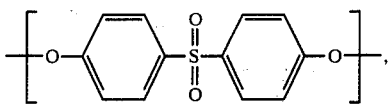

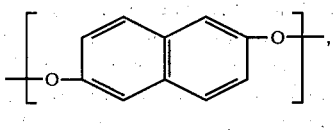

and mixtures of the foregoing.

29. A wholly aromatic polyester in accordance with claim 25 wherein said symmetrical dicarboxy aryl moiety III is selected from the group consisting of:

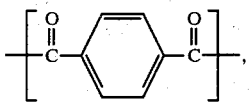

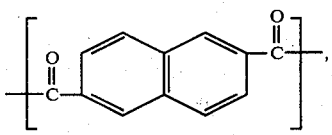

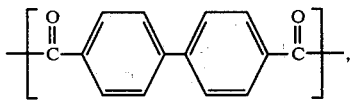

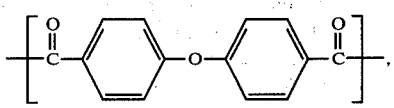

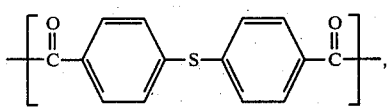

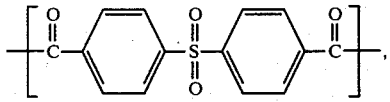

and mixtures of the foregoing.

30. A wholly aromatic polyester in accordance with claim 25 wherein moiety II is

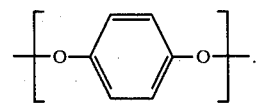

31. A wholly aromatic polyester in accordance with claim 25 wherein moiety III is

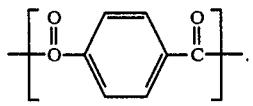

32. A wholly aromatic polyester in accordance with claim 25 which consists essentially of approximately 60 mole percent of moiety I, approximately 20 mole percent of moiety II, and approximately 20 mole percent of moiety III.

33. A wholly aromatic polyester in accordance with claim 25 which exhibits an inherent viscosity of at least 0.5 dl./g. when dissolved in a concentration of 0.1 percent by weight in pentafluorophenol at 60° C.

34. A wholly aromatic polyester in accordance with claim 25 which exhibits an inherent viscosity of at least 1.0 dl./g. when dissolved in a concentration of 0.1 percent by weight in pentafluorophenol at 60° C.

35. The wholly aromatic polyester capable of forming an anisotropic melt in accordance with claim 25 which includes from approximately 1 to 60 percent by weight of a solid filler and/or reinforcing agent based on the total weight of the polyester.

36. A fiber which has been melt spun from the wholly aromatic polyester of claim 25.

37. A film which has been melt extruded from the wholly aromatic polyester of claim 25.

38. A molded article comprising the wholly aromatic polyester of claim 25.

39. A process for preparing a wholly aromatic polyester capable of forming an anisotropic melt comprising:
(a) esterifying the hydroxyl portion of a monomer having the formula:

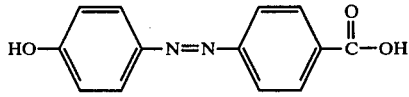

which may include substitution of at least one hydrogen atom present upon an aromatic ring with said optional substitution is present being selected from the group consisting of an alkyl radical of 1 to 4 carbon atoms, an alkoxy radical of 1 to 4 carbon atoms, halogen, and mixtures thereof;
(b) heating said esterified monomer to a temperature of from approximately 200° to 300° C. for from approximately 1 to 4 hours;
(c) reducing the reaction pressure to within the range from approximately 0.1 to about 5 mm. Hg and maintaining the temperature within the range of from approximately 275° to 340° C. for from approximately 15 to 90 minutes while at said pressure; and
(d) recovering the polyester.

40. A process for preparing a wholly aromatic polyester capable of forming an anisotropic melt in accordance with claim 39 wherein said monomer is acetylated in step (a).

41. A process for preparing a wholly aromatic polyester capable of forming an anisotropic melt in accordance with claim 39 wherein the hydroxyl portion of the additional monomer

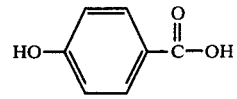

is esterified and said additional monomer is provided with the esterified monomer identified in step (a) during step (b).

42. A process for preparing a wholly aromatic polyester capable of forming an anisotropic melt in accordance with claim 41 wherein said additional monomer is acetylated.

43. A process for preparing a wholly aromatic polyester capable of forming an anisotropic melt in accordance with claim 39 wherein the hydroxyl portion of the additional monomer

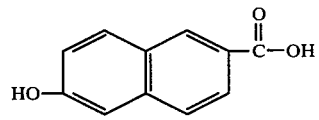

is esterified and said additional monomer is provided with the esterified monomer identified in step (a) during step (b).

44. A process for preparing a wholly aromatic polyester capable of forming an anisotropic melt in accordance with claim 43 wherein said additional monomer is acetylated.

45. A process for preparing a wholly aromatic polyester in accordance with claim 39 wherein the additional monomers HO—Ar—OH in esterified form and

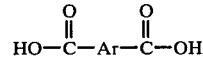

are provided with the esterified monomer of step (a) in step (b), wherein Ar may be independently selected in each instance and is a symmetrical divalent radical comprising at least one aromatic ring which may include substitution of at least one hydrogen atom present upon an aromatic ring with said optional substitution if present being selected from the group consisting of an alkyl radical of 1 to 4 carbon atoms, an alkoxy radical of 1 to 4 carbon atoms, halogen and mixtures thereof.

46. A process for preparing a wholly aromatic polyester in accordance with claim 45 wherein each esterified monomer present in step (b) is acetylated.

47. A process for preparing a wholly aromatic polyester capable of forming an anisotropic melt in accordance with claim 39 wherein steps (b) and (c) are carried out in the substantial absence of oxygen.

* * * * *